(12) United States Patent
Suh et al.

(10) Patent No.: US 11,714,036 B2
(45) Date of Patent: Aug. 1, 2023

(54) APPARATUS FOR EVALUATING HIGH-TEMPERATURE CREEP BEHAVIOR OF METALS, AND METHOD OF EVALUATING THE SAME

(71) Applicant: KOREA INSTITUTE OF SCIENCE AND TECHNOLOGY, Seoul (KR)

(72) Inventors: Jin-Yoo Suh, Seoul (KR); Han-Jin Kim, Seoul (KR); Young Whan Cho, Seoul (KR); Woo Sang Jung, Seoul (KR); Jae-Hyeok Shim, Seoul (KR); Dong-Ik Kim, Seoul (KR); Young-Su Lee, Seoul (KR); Jihyun Hong, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 220 days.

(21) Appl. No.: 17/089,567

(22) Filed: Nov. 4, 2020

(65) Prior Publication Data
US 2021/0140862 A1 May 13, 2021

(30) Foreign Application Priority Data
Nov. 8, 2019 (KR) .................. 10-2019-0142855

(51) Int. Cl.
*G01N 3/18* (2006.01)
*G01N 3/10* (2006.01)

(52) U.S. Cl.
CPC ....... *G01N 3/18* (2013.01); *G01N 2203/0071* (2013.01); *G01N 2203/0226* (2013.01)

(58) Field of Classification Search
CPC ............. G01N 3/18; G01N 2203/0071; G01N 2203/0226; G01N 1/36; G01N 3/08; G01N 15/08; G01N 3/02; G01N 3/12; G01N 17/006; G01N 15/0806; G01N 17/00; G01N 3/10; G01N 1/42; C21D 10/00; C22C 30/00; C22C 38/50; C22C 38/60; E21B 43/24; B32B 1/08
See application file for complete search history.

(56) References Cited

U.S. PATENT DOCUMENTS 5,641,912 A * 6/1997 Manahan, Sr. .......... G01N 3/20
  73/818
2013/0023419 A1* 1/2013 Matsushita ............. B32B 25/08
  428/447

* cited by examiner

*Primary Examiner* — Brandi N Hopkins
(74) *Attorney, Agent, or Firm* — Rabin & Berdo, P.C.

(57) ABSTRACT

Provided is an apparatus for evaluating high-temperature creep behavior of metals, the apparatus including a chamber configured to fix a metal sample in an inner space sealed from an external environment, and including, at a lower portion, a metal tube stretchable in a length direction by a pressure of a gas, wherein the apparatus is configured in such a manner that a load received by the chamber in the length direction due to the pressure of the gas injected into the chamber is applied to the metal sample.

11 Claims, 5 Drawing Sheets

APPARATUS FOR EVALUATING HIGH-TEMPERATURE CREEP BEHAVIOR OF METALS, AND METHOD OF EVALUATING THE SAME

CROSS-REFERENCE TO RELATED PATENT APPLICATION

This application claims the benefit of Korean Patent Application No. 10-2019-0142855, filed on Nov. 8, 2019, in the Korean Intellectual Property Office, the disclosure of which is incorporated herein in its entirety by reference.

BACKGROUND OF THE INVENTION

1. Field of the Invention

The present invention relates to an apparatus capable of evaluating high-temperature creep behavior of a metal sample in a controlled gas, e.g., hydrogen or oxygen, and a method of evaluating the same and, more particularly, to a method of fabricating a simple apparatus for evaluating high-temperature creep behavior in a gas atmosphere by applying a load to samples by using a gas pressure in a chamber sealed from an external environment, without a large-volume mechanical or hydraulic load generator used in general mechanical behavior evaluation apparatuses, and a method of evaluating high-temperature creep behavior of a metal sample under a gas pressure by using the apparatus.

2. Description of the Related Art

The present invention relates to a simple apparatus and method of evaluating high-temperature creep behavior of a metal sample in a gas atmosphere. The high-temperature creep behavior is evaluated by continuously measuring creep strain of metal structures exposed to a load for a long time at a high temperature. Industrially, high-temperature creep behavior of metal components included in reactors and pipes of chemical and energy plants, turbines and steam pipes of thermoelectric and nuclear power plants, aircraft gas turbine engines, etc. has been mainly evaluated. Although high-temperature mechanical behavior in the air is generally evaluated, in some cases, a high temperature and a load need to be applied to metal materials in a gas atmosphere, e.g., a hydrogen atmosphere or a pressurized oxygen atmosphere. For example, hydrogen gas under a heated condition is used in a residue upgrading complex of an oil refinery. A phenomenon that cementite ($Fe_3C$) in steel materials used for pipes in the residue upgrading complex is decomposed by hydrogen absorbed into the steel materials at a high temperature to form methane gas is called a high-temperature hydrogen attack, and a large number of explosions caused by serious deterioration in structural stability of the steel materials due to methane voids in the materials have been reported. Besides, in a Haber-Bosch facility for producing ammonia based on reaction between hydrogen and nitrogen, steel materials are exposed to a high hydrogen pressure in a high-temperature hydrogen atmosphere. In a nuclear fusion reactor which is being studied as future technology, reactor materials in a high-temperature are also exposed to a hydrogen atmosphere. In addition, development of a large number of application technologies using a high-temperature hydrogen atmosphere as well as a room-temperature hydrogen atmosphere is expected due to current high interest in hydrogen, and thus it should be preliminary evaluated whether metallic materials used as reactor or housing materials in a high-temperature hydrogen atmosphere are capable of stably serving as structural materials. Furthermore, instead of general air combustion, pure oxygen combustion technology using pure oxygen for combustion reaction is being studied for power plant facilities for generating electricity based on combustion of coal or gas and, in this case, related materials are exposed to a high partial pressure of oxygen and thus creep behavior of structural materials may be affected under a high-temperature and high-pressure condition.

High-temperature creep evaluation apparatuses mostly use weights to apply a certain load for a long time and thus are large in volume. To perform high-temperature long-term creep evaluation in a gas atmosphere instead of the air, commercial evaluation apparatuses are not usable and thus a gas-atmosphere evaluation apparatus needs to be manually fabricated by, for example, mounting a gas atmosphere furnace to an existing creep evaluation apparatus. In this case, a rod-shaped load transmission shaft connected to a rod-shaped sample to transmit a load to the sample is inserted into a gas chamber for controlling the atmosphere of the sample and, at the same time, needs to gradually slide out of the gas chamber as a high-temperature creep test is progressed to deform the sample. That is, there is a technical problem in that the load transmission shaft and the gas chamber of the creep evaluation apparatus need to allow shaft-direction displacement of the load transmission shaft and to seal the gas chamber from an external atmosphere. In particular, such a problem may occur more seriously when the test is performed at a high temperature and thus the whole apparatus needs to be designed in a very large volume or a complex cooling system needs to be installed. For this reason, high-temperature long-term creep evaluation has not been easily performed in a gas atmosphere instead of the air. Particularly, due to the characteristics of creep evaluation for which a load needs to be maintained for a long time, it may not be technically easy to appropriately maintain the gas atmosphere in the gas chamber for a long time.

SUMMARY OF THE INVENTION

The present invention provides a simple and small-sized mechanical apparatus for evaluating high-temperature creep behavior of a metal sample for a long time in a gas atmosphere. The apparatus is designed in such a manner that the metal sample is provided and fixed in a sealed chamber using a metal tube (e.g., a bellows) including a plurality of folds to be stretchable in a length direction so as to achieve a simple structure and a small volume of the apparatus and that a load provided to the chamber in the length direction by a gas pressure applied into the chamber is applied to the sample, and may be used as a behavior evaluation apparatus capable of applying a constant load to a sample for a long time without a large load generator. However, the scope of the present invention is not limited thereto.

According to an aspect of the present invention, there is provided a gas-atmosphere high-temperature creep behavior evaluation apparatus characterized in that a sealed cylindrical chamber is provided, load transmission shafts are separately attached to upper and lower portions of the chamber in the chamber, a general tensile sample is connected and fixed between the load transmission shaft connected to the upper portion of the chamber and the load transmission shaft connected to the lower portion of the chamber in order to provide the sample in a middle portion of the chamber, a heater surrounds the middle portion of the chamber, where the sample is located, to control a temperature at the location of the sample in the chamber, a gas pressure is applied into the chamber to apply a load to the cylindrical chamber in a radial direction of a circular cross-section and to the upper and lower portions of the cylindrical chamber in a length direction of the chamber, a metal tube (e.g., a bellows) including a plurality of folds to be stretchable in the length direction is provided at the lower portion, where a temperature is not high due to a distance from the heater, to help the upper portion of the chamber to be pushed upward by receiving the load in an upward direction due to the gas pressure applied into the chamber, the sample is deformed when the upper portion of the chamber is pushed upward and strain is measured by a linear variable differential transformer (LVDT) located outside the upper portion of the chamber, the pressure reduced due to an increase in volume of the whole chamber when the upper portion of the chamber is pushed upward is regulated into a constant pressure by additionally supplying the gas into the chamber by using a pressure controller or a regulator of a gas cylinder, the chamber is maintained in a state completely sealed from an external environment when the sample receives tensile strain and the chamber is stretched, and a thermocouple is welded to the surface of or is located adjacent to the sample to serve as a temperature controller capable of measuring and controlling a temperature of the sample in real time.

Additionally, in order to control the load received by the sample while constantly maintaining a partial pressure of a specific gas, the specific gas may be mixed with an inert gas (e.g., argon) at a specific ratio and be supplied into the chamber.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

Figure 1:
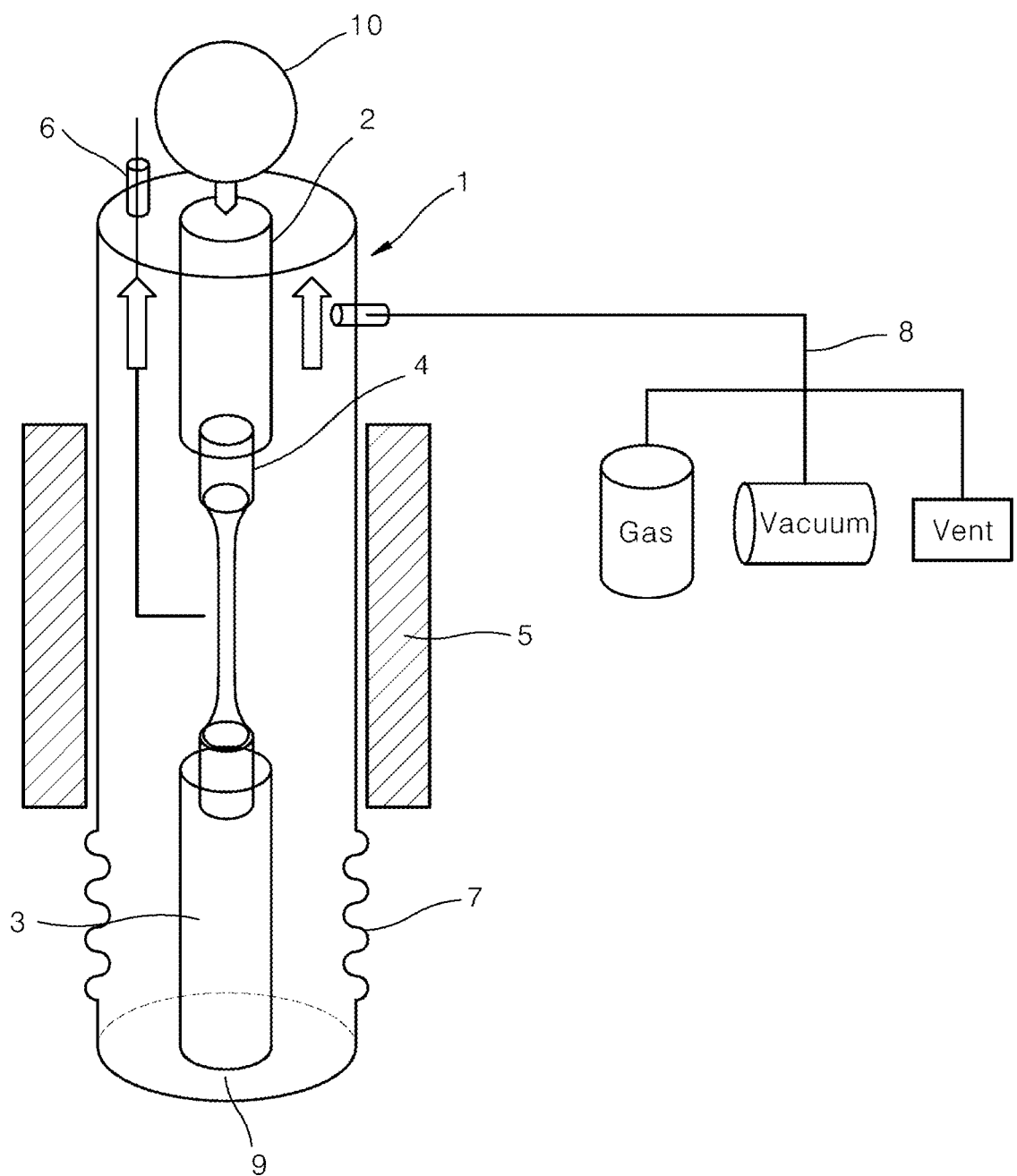
FIG. 1 is a schematic diagram of a gas-atmosphere high-temperature creep behavior evaluation apparatus according to an embodiment of the present invention.

Hereinafter, the present invention will be described in detail by explaining embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the sizes of some elements may be exaggerated or reduced for convenience of explanation, and like reference numerals denote like elements.

The present invention proposes the concept of fabricating and operating a gas-atmosphere high-temperature creep behavior evaluation apparatus capable of evaluating high-temperature creep behavior of a metallic material in a desired gas atmosphere, e.g., hydrogen, argon, or oxygen, of installing and operating an evaluation apparatus in a small space at a low cost, and of simultaneously evaluating a plurality of samples by installing a plurality of apparatuses in a small space at a low cost. To this end, the present invention provides a gas-atmosphere high-temperature creep behavior evaluation apparatus including a chamber for completely sealing a metal sample from an external environment, a gas supplier (e.g., a gas pressure controller or a regulator) for applying a gas pressure into the chamber to apply a load to the cylindrical chamber in a radial direction of a circular cross-section and to upper and lower portions of the cylindrical chamber in a length direction of the chamber, a metal tube (e.g., a bellows) including a plurality of folds to be stretchable in a length direction and provided at the lower portion of the chamber, where a temperature is not high due to a distance from a heater, to help the upper portion of the chamber to be pushed upward by receiving the load in an upward direction due to the gas pressure applied into the chamber, and a pressure controller or a regulator of a gas cylinder for additionally supplying the gas to compensate for a reduction in pressure due to an increase in volume of the chamber when the upper portion of the chamber is pushed upward.

The present invention relates to an apparatus for evaluating high-temperature creep behavior of a metal sample in a gas atmosphere, and is characterized in that (i) a chamber is sealed but is stretchable in a length direction by using a bellows, (ii) the metal sample is fixed in the chamber so as to be stretched together when the chamber is stretched in the length direction, and (iii) a load received by the metal sample is controlled by controlling a gas pressure in the chamber.

Due to the above-described configuration, (i) high-temperature creep behavior of a metal material in a desired gas atmosphere, e.g., hydrogen, argon, or oxygen, may be evaluated, (ii) an evaluation apparatus may be installed and operated in a small space at a low cost, and (iii) a plurality of samples may be simultaneously evaluated by installing a plurality of apparatuses in a small space at a low cost.

Reference will now be made in detail to embodiments of the present invention, examples of which are illustrated in the accompanying drawings.

FIG. 1 is a schematic diagram of a gas-atmosphere high-temperature creep behavior evaluation apparatus according to an embodiment of the present invention.

Referring to FIG. 1, an operation process of the gas-atmosphere high-temperature creep behavior evaluation apparatus is schematically shown. A sealed chamber 1 is provided, upper and lower load transmission shafts 2 and 3 are respectively attached to top and bottom surfaces of the chamber 1, and a sample 4 is fixed by the two load transmission shafts 3 and 4 in a middle portion of the chamber 1.

A heater 5 is provided around the middle portion of the chamber 1, i.e., the portion where the sample 4 is located, to control a temperature in the vicinity of the sample 4. A thermocouple (TC) 6 is welded to the surface of or is located adjacent to the sample 4 to serve as a temperature controller capable of measuring and controlling a temperature of the sample 4 in real time.

As a metal tube including a plurality of folds to be expandable in a length direction, a bellows 7 is provided at an upper or lower portion of the chamber 1, i.e., at a location where a temperature is not high due to a distance from the heater 5, and helps the upper portion of the chamber 1 to be pushed upward by receiving a load applied in an upward direction by a gas pressure applied into the chamber 1.

When a gas is supplied through a gas pipe 8 into the chamber 1 to increase a pressure in the chamber 1, the bellows 7 expands in a length direction and thus a tensile load is applied to the sample 4. In this case, a load cell 9 attached to the lower load transmission shaft 3 in the chamber 1 measures the load applied to the sample 4 in real time. When tensile strain of the sample 4 occurs due to the applied load, the chamber 1 is stretched in a length direction and a stretched length is measured in real time by a linear variable differential transformer (LVDT) 10 attached outside the upper portion of the chamber 1.

The pressure reduced due to an increase in volume of the whole chamber 1 when the upper portion of the chamber 1 is pushed upward is regulated into a constant pressure by additionally supplying the gas through the gas pipe 8 into the chamber 1 by using a pressure controller or a regulator of a gas cylinder.

Additionally, in order to control the load received by the sample 4 while constantly maintaining a partial pressure of a specific gas, the specific gas may be mixed with an inert gas (e.g., argon) at a specific ratio and be supplied into the chamber 1.

Figure 2:
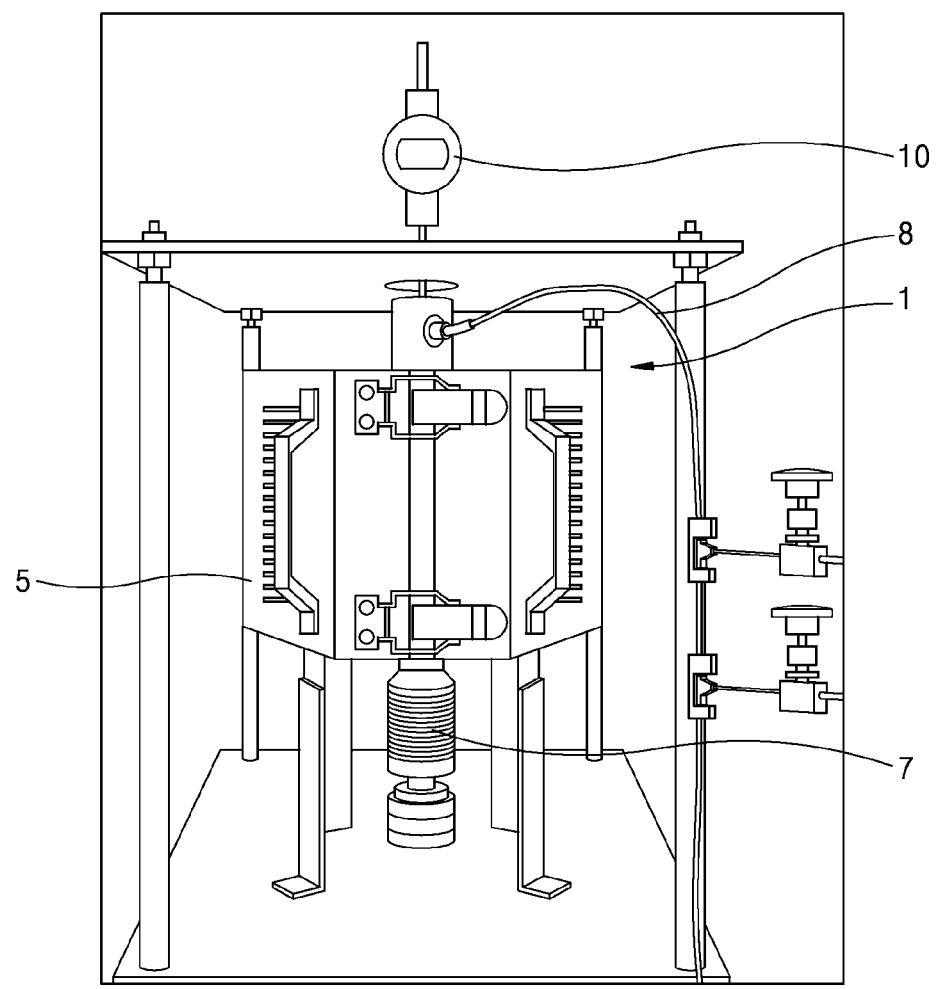
FIG. 2 is a photographic image showing that a gas-atmosphere high-temperature creep behavior evaluation apparatus according to an embodiment of the present invention is installed and operated.

FIG. 2 is a photographic image showing that a gas-atmosphere high-temperature creep behavior evaluation apparatus according to an embodiment of the present invention is installed and operated.

FIG. 2 shows that the gas-atmosphere high-temperature creep behavior evaluation apparatus of FIG. 1 is fabricated by reflecting all the technical features described above in relation to FIG. 1 and is installed and operated in a fume hood.

Figure 3:
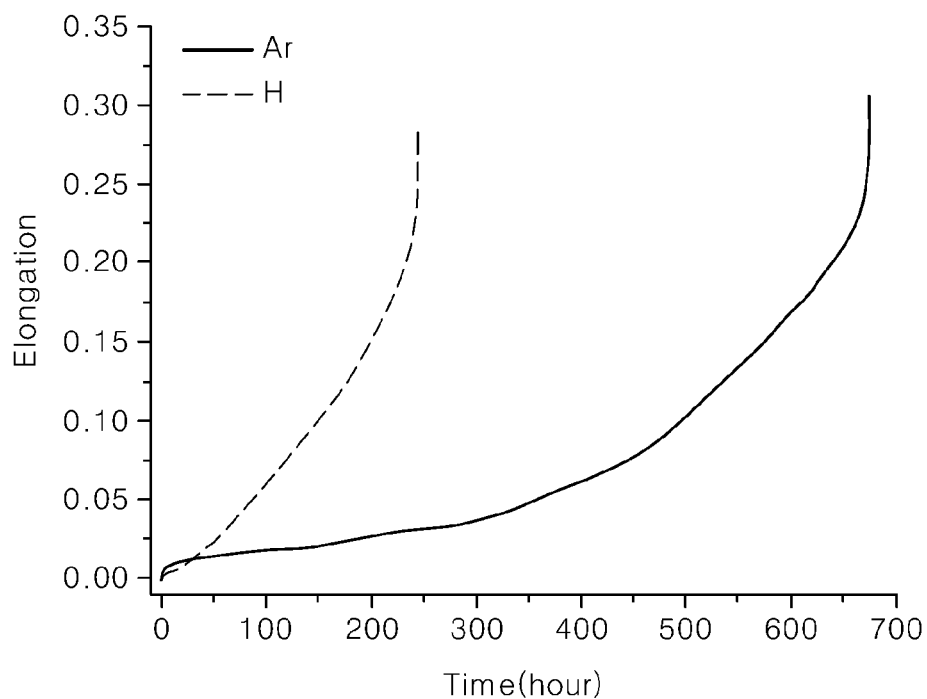
FIG. 3 is a graph showing a result of evaluating high-temperature creep behavior of steel samples in an argon atmosphere and a hydrogen atmosphere by using a gas-atmosphere high-temperature creep behavior evaluation apparatus according to an embodiment of the present invention.

According to an embodiment of the present invention, as shown in FIG. 3, creep behavior of same-material samples at a high temperature in an argon atmosphere and a hydrogen atmosphere may be comparatively evaluated. FIG. 3 shows displacements measured in real time due to strain of cylindrical T11 grade steel (0.11 C-0.56 Si-0.45 Mn-0.008 P-0.004 S-1.13 Cr-0.46 Mo) samples having a diameter of 3 mm and a gauge length of 15 mm (see FIG. 4) at a temperature of 530° C. by supplying argon and hydrogen at 10 bar to apply a stress of about 220 MPa to cross-sections of the samples for about 700 hours in the argon atmosphere and for about 250 hours in the hydrogen atmosphere. It is shown that a creep life of the same material is greatly reduced in the hydrogen-atmosphere creep test compared to the argon (i.e., an inert gas)-atmosphere creep test.

Figure 4:
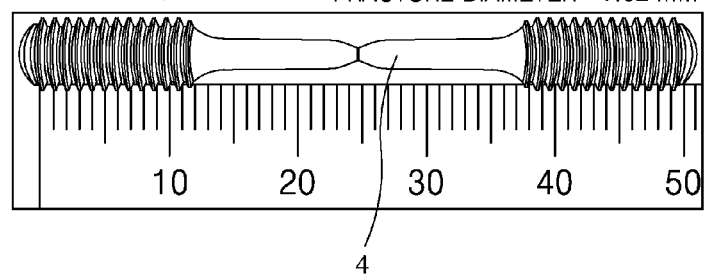
FIG. 4 includes photographic images showing fracture shapes of steel samples after evaluating high-temperature creep behavior of the steel samples in an argon atmosphere and a hydrogen atmosphere by using a gas-atmosphere high-temperature creep behavior evaluation apparatus according to an embodiment of the present invention.
Figure 4:
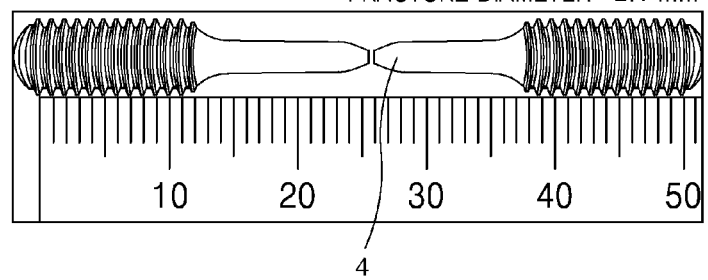

FIG. 4 shows creep fracture shapes of the samples tested in FIG. 3. It is shown that the fracture shapes of the samples in the argon (i.e., an inert gas)-atmosphere creep test and the hydrogen-atmosphere creep test are distinctly different. It is also shown that, in the argon-atmosphere creep test, the sample elongates more and a diameter of the final fracture is greatly reduced compared to the initial diameter due to necking which indicates local strain. On the contrary, it is shown that, in the hydrogen atmosphere, necking rarely occurs and the fracture is almost perpendicular to a load direction. Therefore, it is proved that the metal sample is embrittled by hydrogen, and this may be used as critical evidence data to infer that the difference in creep life shown in FIG. 3 does not merely result from experimental scattering but is caused by the hydrogen gas.

Figure 5:
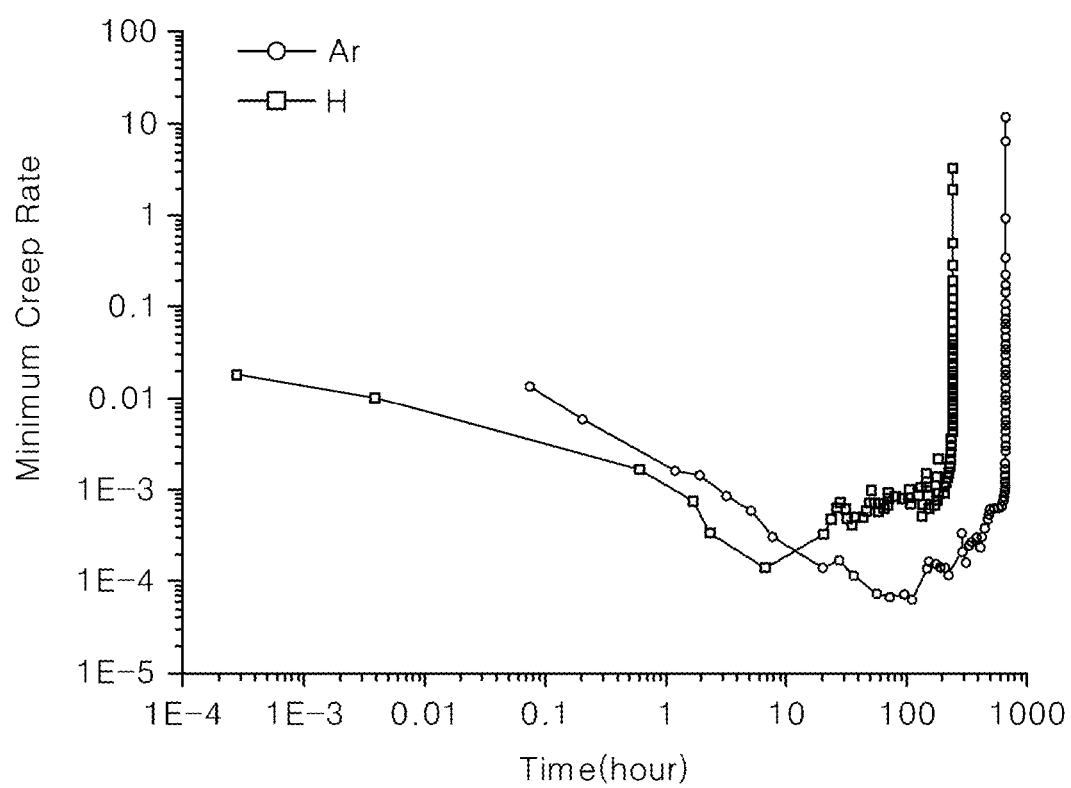
FIG. 5 is a graph showing strain rate data calculated based on strain data (see FIG. 3) of steel samples after evaluating high-temperature creep behavior of the steel samples in an argon atmosphere and a hydrogen atmosphere by using a gas-atmosphere high-temperature creep behavior evaluation apparatus according to an embodiment of the present invention.

FIG. 5 shows strain rate data obtained by differentiating the strain data of FIG. 3 based on time. A strain rate is very critical and fundamental data to analyze creep behavior, and a gas-atmosphere high-temperature creep behavior evaluation apparatus fabricated according to an embodiment of the present invention may normally produce strain rate data. Referring to FIG. 5, it is clearly shown that the samples reach the same-level minimum creep rates in the argon atmosphere and the hydrogen atmosphere but the sample in the hydrogen atmosphere enters a tertiary creep stage and is fractured faster.

Figure 6:
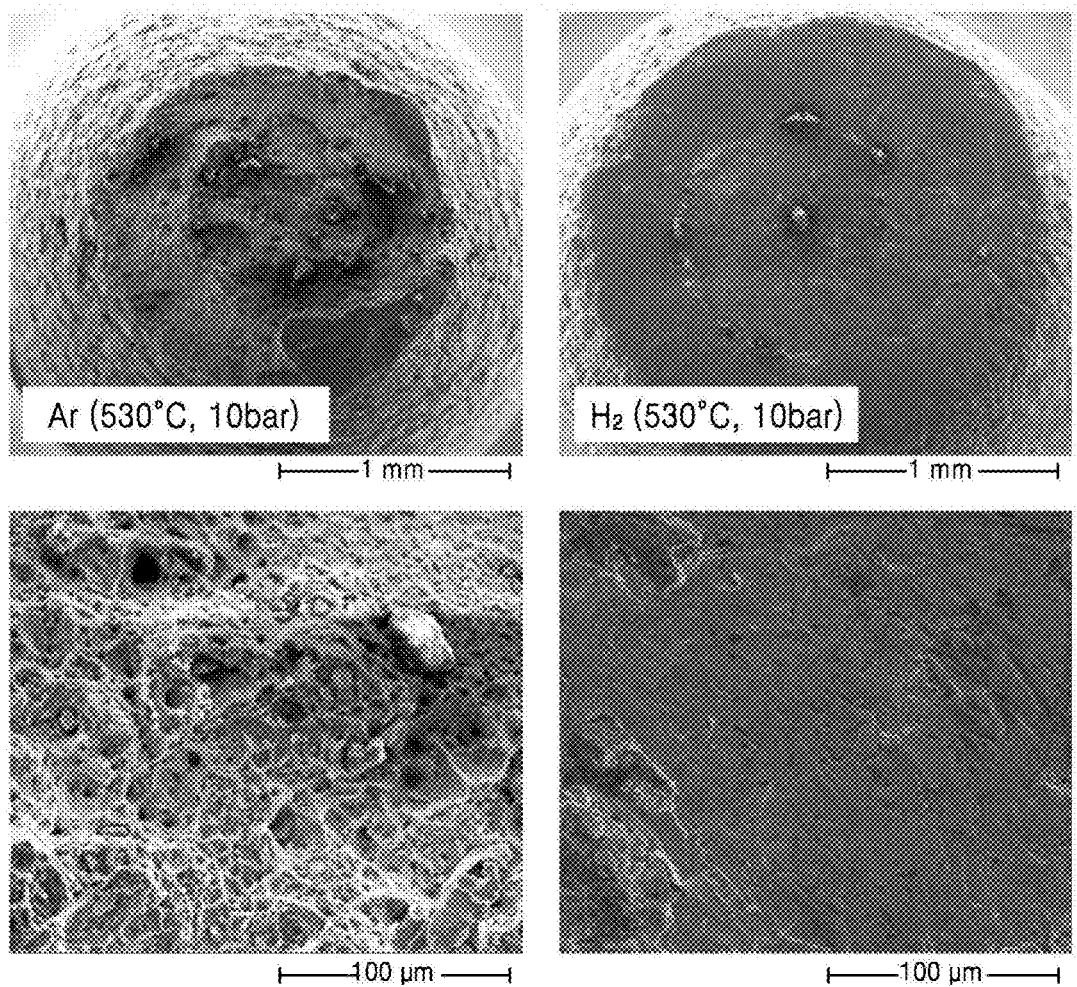
FIG. 6 includes microscopic images showing fractures of steel samples after evaluating high-temperature creep behavior of the steel samples in an argon atmosphere and a hydrogen atmosphere by using a gas-atmosphere high-temperature creep behavior evaluation apparatus according to an embodiment of the present invention.

FIG. 6 shows creep fractures of the samples tested in FIG. 3. It is shown that the fractures in the argon atmosphere and the hydrogen atmosphere are distinctly different. As such, it is proved that the metal sample is embrittled by hydrogen, and this may be used as critical evidence data to infer that the difference in creep life shown in FIG. 3 does not merely result from experimental scattering but is caused by the hydrogen gas.

According to some embodiments of the present invention, (i) high-temperature creep behavior of a metal material in a desired gas atmosphere, e.g., hydrogen, argon, or oxygen, may be evaluated, (ii) an evaluation apparatus may be installed and operated in a small space at a low cost, and (iii) a plurality of samples may be simultaneously evaluated by installing a plurality of apparatuses in a small space at a low cost. However, the scope of the present invention is not limited to the above-described effects.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. An apparatus for evaluating high-temperature creep behavior of metals, the apparatus comprising a chamber configured to fix a metal sample in an inner space sealed from an external environment, and comprising, at a lower portion, a metal tube stretchable in a length direction by a pressure of a gas,
wherein the apparatus is configured such that a load received by the chamber in the length direction due to the pressure of the gas injected into the chamber is applied to the metal sample.

2. The apparatus of claim 1, wherein the metal tube is stretched in the length direction and an upper portion of the chamber is pushed upward due to the pressure of the gas to deform the metal sample.

3. The apparatus of claim 2, further comprising a heater for controlling a temperature of the metal sample by heating an outside of the chamber near the metal sample,
wherein the metal tube is provided at the lower portion of the chamber spaced downward from the heater.

4. The apparatus of claim 3, further comprising:
an upper load transmission shaft attached to an inner top surface of the chamber and extending in a downward direction; and
a lower load transmission shaft attached to an inner bottom surface of the chamber and extending in an upward direction,
wherein the metal sample is connected and fixed to the upper and lower load transmission shafts.

5. The apparatus of claim 4, wherein, when the upper portion of the chamber is pushed upward due to the pressure of the gas injected into the chamber and a tensile load is applied through the upper and lower load transmission shafts to the metal sample to deform the metal sample, the upper and lower load transmission shafts do not protrude from the chamber and are located in the chamber to maintain a sealed state of the chamber.

6. The apparatus of claim 4, further comprising:
a linear variable differential transformer (LVDT) connected to the top outside surface of the main chamber to measure strain of the metal sample in real time; and
a load cell connected to the lower load transmission shaft to measure a tensile load applied to the metal sample.

7. The apparatus of claim 2, further comprising a gas supplier for injecting the gas into the chamber,
wherein the gas supplier additionally supplies the gas into the chamber to compensate for a reduction in pressure due to an increase in internal volume of the chamber when the upper portion of the chamber is pushed upward.

8. The apparatus of claim 1, wherein the metal tube comprises a bellows comprising a plurality of folds.

9. The apparatus of claim 1, further comprising a temperature controller attached to a surface of or located adjacent to the metal sample to measure and control a temperature of the metal sample in real time.

10. A method of evaluating high-temperature creep behavior of metals, the method comprising:
a first step for preparing a sealed chamber comprising a metal tube stretchable in a length direction by a pressure of a gas;
a second step for mounting and fixing a metal sample in the chamber; and
a third step for applying a gas pressure into the chamber such that a load received when the chamber is stretched in the length direction due to the gas pressure is transmitted to the metal sample to cause tensile strain of the metal sample,
wherein a pressure of the chamber is constantly maintained in a completely sealed state during the third step.

11. The method of claim 10, further comprising a step for additionally supplying the gas into the chamber to compensate for a reduction in pressure due to an increase in internal volume of the chamber when the chamber is stretched in the length direction during the third step.

* * * * *